United States Patent [19]

Novacek et al.

[11] Patent Number: 4,804,016
[45] Date of Patent: Feb. 14, 1989

[54] FLUID CONTROLLER WITH IMPROVED PRESSURE BALANCING

[75] Inventors: William J. Novacek, Bloomington; Dwight B. Stephenson, Savage, both of Minn.

[73] Assignee: Eaton Corporation, Cleveland, Ohio

[21] Appl. No.: 204,333

[22] Filed: Jun. 9, 1988

[51] Int. Cl.$^4$ .......................... B62D 5/08; F16K 39/00
[52] U.S. Cl. ................................. 137/625.23; 60/384; 251/283
[58] Field of Search ...................... 137/625.23, 625.24, 137/596.13; 251/281, 283; 60/384, 494

[56] References Cited

U.S. PATENT DOCUMENTS

| | | | |
|---|---|---|---|
| 3,425,448 | 2/1969 | Peterson | 137/625.24 |
| 4,016,949 | 4/1977 | Plate et al. | 60/384 X |
| 4,037,620 | 7/1977 | Johnson | 60/384 X |
| 4,096,883 | 6/1978 | Yip | 60/384 X |
| 4,159,723 | 7/1979 | Bartrup et al. | 137/596.13 |
| 4,177,834 | 12/1979 | Bonney | 251/283 X |
| 4,311,171 | 1/1982 | Roberts | 137/625.23 |
| 4,336,687 | 6/1982 | Morgan | 60/384 |
| 4,495,769 | 1/1985 | Tischer et al. | 60/384 X |
| 4,558,720 | 12/1985 | Larson et al. | 137/625.24 |
| 4,620,416 | 11/1986 | Yip et al. | 60/384 |
| 4,730,544 | 3/1988 | Jorgensen | 60/384 X |

Primary Examiner—John Rivell
Attorney, Agent, or Firm—L. J. Kasper

[57] ABSTRACT

A fluid controller (15) is provided of the type for directing pressurized fluid from a source (13) to a steering cylinder (17). The controller includes a housing defining right and left turn ports (32 and 34) and corresponding annular grooves (32g and 34g). The controller valving includes a cylindrical sleeve (37) and a spool (35). Steering against the cylinder stops results in trapped pressurized fluid in one of the annular grooves (32g or 34g) after the valving returns to the neutral position. The sleeve (37) is provided with pressure balancing passages (93 and 97) which are positioned to communicate trapped pressurized fluid into pressure balancing areas (85 or 99, respectively). The pressurized fluid in the balancing areas is able to counteract the clamping force on the sleeve resulting from the trapped fluid in one of the annular grooves (32g or 34g), and thereby prevent a subsequent stiction condition when the vehicle operator attempts to begin the next steering maneuver.

9 Claims, 4 Drawing Sheets

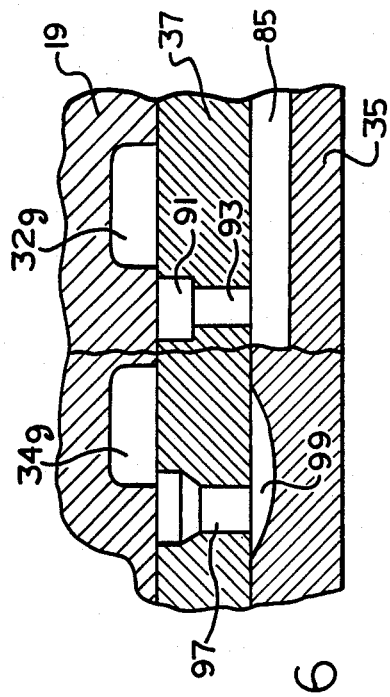
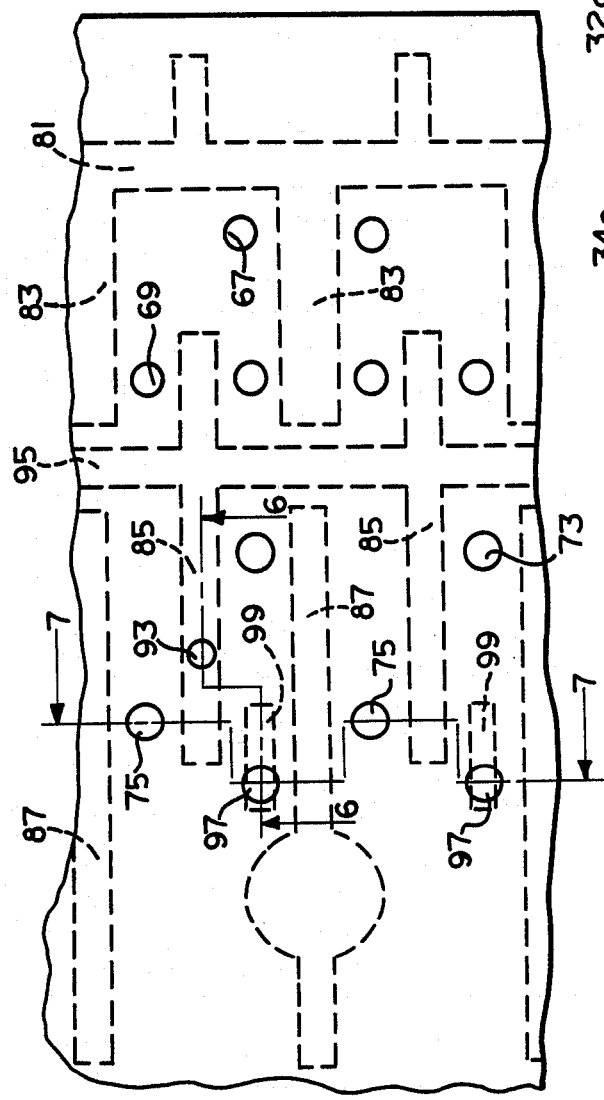
FIG. 5
FIG. 6

FLUID CONTROLLER WITH IMPROVED PRESSURE BALANCING

BACKGROUND OF THE DISCLOSURE

The present invention relates to fluid controllers, and more particularly, to such controllers which are used to control the flow of fluid from a source to a fluid pressure actuated device, especially a device of the type having some sort of mechanical stop means to limit the movement or travel of the movable portion of the pressure actuated device. A typical example is in a hydrostatic power steering system in which the fluid controller controls and meters the flow of pressurized fluid to the vehicle steering cylinder.

The present invention is especially advantageous when used with a fluid controller of the type in which the valving comprises a pair of valve members, one of which is generally cylindrical and hollow and surrounds the other valve member. Such a controller is sold commercially by the assignee of the present invention under the trademark "ORBITROL" ® steering control unit.

One of the problems which has occurred in connection with the use of such controllers in hydrostatic power steering systems has been the occurrence of a "stiction" condition. Stiction occurs when the controller is operated to actuate the steering cylinder against the cylinder stops, after which the valve means is permitted to return to the neutral position. The above-described mode of operation results in trapping pressurized fluid in the cylinder, the conduit to the cylinder, and various ports and passages within the controller. In a typical controller of the type to which the present invention relates, this trapped, pressurized fluid surrounds a portion of the outer, hollow cylindrical valve member, and causes that portion of the valve member to be slightly deformed and "clamp" onto the inner valve member. The next time the operator attempts to initiate a steering maneuver, the hollow valve member being clamped on the other valve member makes it more difficult to rotate the steering wheel and initiate valving action. The resulting difficulty in turning the wheel is referred to as the "stiction" condition.

Those skilled in the art have attempted to overcome the problem of clamping and stiction in several different ways. One attempted solution has involved locating a number of axial grooves on the outer surface of the inner valve member, to reduce the clamping area, i.e., the area of possible clamping engagement between the inner and outer valve members.

Another solution attempted by those skilled in the art has been simply to increase the radial clearance between the inner and outer valve members, such that a greater amount of "collapse" of the outer valve member must occur in order to have any clamping engagement of the outer valve member on the inner valve member. Neither of the attempted solutions described above has been fully satisfactory in eliminating the stiction condition and maintaining basic steering function.

SUMMARY OF THE INVENTION

Accordingly, it is an object of the present invention to provide an improved fluid controller for use with fluid pressure actuated devices of the type having stop means, wherein the improved fluid controller substantially eliminates the cause of the stiction condition.

It is a more specific object of the present invention to provide an improved fluid controller having pressure balancing means disposed inwardly of the hollow valve member to counteract the clamping forces of the trapped pressurized fluid disposed about the valve member.

The above and other objects of the invention are accomplished by the provision of an improved controller of the type including housing means defining an inlet port for connection to the source of pressurized fluid, a return port, and first and second control fluid ports for connection to the fluid pressure operated device. Valve means as disposed in the housing and includes a primary, rotatable, generally cylindrical valve member and a relatively rotatable, generally cylindrical and hollow follow-up valve member surrounding the primary valve member. The valve members define a neutral position and an operating position relative to each other. The housing means and valve means cooperate to define a main fluid path communicating between the inlet port and the first control fluid port when the valve means is in the operating position. A fluid actuated means is included for imparting follow-up movement to the follow-up valve member in response to the flow of fluid to the main fluid path. The housing means and the follow-up valve member are configured such that pressurized fluid contained in the main fluid path when the valve means is in the operating position may become trapped as the valve means returns to the neutral position, the trapped fluid being disposed about the follow-up valve member, tending to bias the follow-up valve member into engagement with the primary valve member.

The improved controller is characterized by the primary and follow-up valve members cooperating to define, at the interface thereof, a plurality of recessed balancing areas spaced circumferentially about the valve members. The primary and follow-up valve members cooperate to define at least one balancing passage means being operable to communicate the trapped pressurized fluid into the recessed balancing areas when the valve means returns to the neutral position. The trapped pressurized fluid in the recessed balancing areas opposes the trapped fluid disposed about the follow-up valve member to substantially prevent clamping engagement of the follow-up valve member to the primary valve member.

BRIEF DESCRIPTION OF THE DRAWINGS

FIG. 5 is an enlarged, fragmentary layout view showing the valving interface of the primary and follow-up valve members of FIGS. 3 and 4.

FIG. 6 is a fragmentary, axial cross-section, similar to FIG. 2, taken on line 6—6 of FIG. 5.

DESCRIPTION OF THE PREFERRED EMBODIMENT

Figure 1:
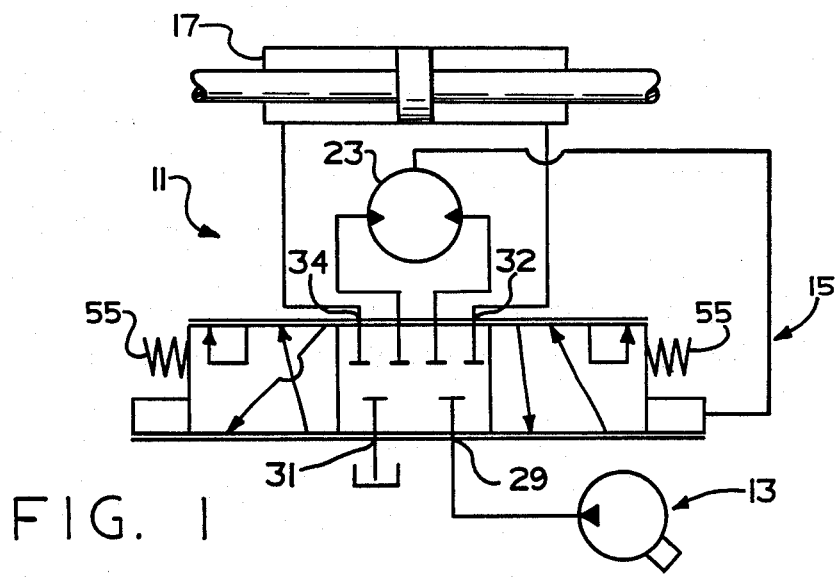
FIG. 1 is a schematic of a typical hydraulic circuit including a fluid controller made in accordance with the present invention.

Referring now to the drawings, which are not intended to limit the present invention, FIG. 1 illustrates schematically a typical hydraulic circuit of the type with which the present invention may be used. The circuit comprises a hydrostatic power steering system, generally designated 11, which is supplied with pressurized fluid by a pressure compensated, variable displacement pump 13, the compensator portion of which is shown only in schematic form, as its operation is well known in the art and forms no part of the present invention.

Figure 2:
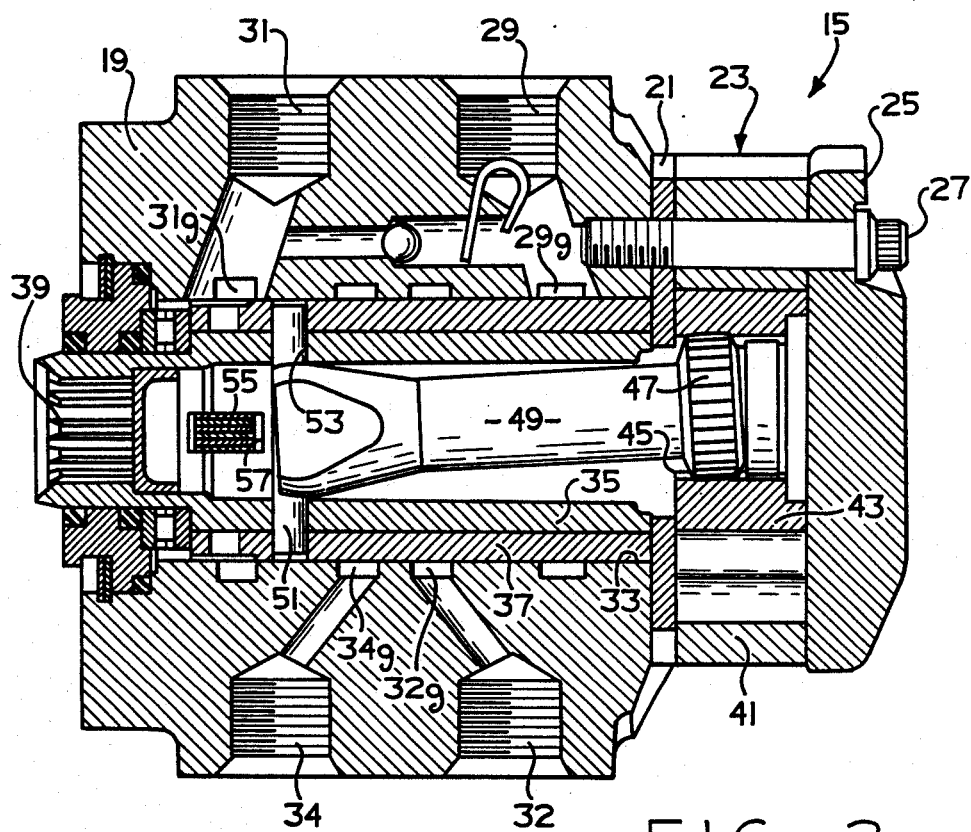
FIG. 2 is an axial cross-section of the controller shown schematically in FIG. 1.

The output from the pump 13 is fed to a steering control valve, generally designated 15, which is shown in greater detail in FIG. 2. The steering control valve 15 (controller) directs the flow of pressurized fluid to either the right end or the left end of a power steering cylinder 17 in response to rotation of a vehicle steering wheel (not shown) in the appropriate direction. Certain details of the controller 15 shown schematically in FIG. 1 will be referenced in connection with the subsequent description of FIGS. 2–4.

The controller 15, which will be described only briefly herein, may be seen in greater detail, and its operation better understood, by reference to U.S. Pat. No. 3,801,239 which is assigned to the assignee of the present invention, and incorporated herein by reference. The controller 15 is comprised of several sections, including a housing 19, a port plate 21, a fluid meter 23, and an end plate 25. These sections are held together in tight sealing engagement by means of a plurality of bolts 27 which are in threaded engagement with the housing 19.

The housing 19 defines a fluid inlet port 29, a fluid return port 31, and a pair of control fluid ports 32 and 34 which, as shown in FIG. 1, are connected to the opposite ends of the cylinder 17. The housing 19 further defines four annular grooves 29g, 31g, 32g, and 34g, which are in open, relatively unrestricted fluid communication with the fluid ports 29, 31, 32, and 34, respectively.

Rotatably disposed within a valve bore 33 defined by the housing 19 is the valving shown schematically in FIG. 1, which comprises a primary, rotatable valve member 35 (spool) and a cooperating, relatively rotatable follow-up valve member 37 (sleeve). The forward end of the spool 35 includes a portion having a reduced diameter and defining a set of internal splines 39 which provide for a direct mechanical connection between the spool 35 and the steering wheel. The spool 35 and sleeve 37 will be described in greater detail subsequently.

The fluid meter 23, in the subject embodiment, comprises a gerotor gear set including an internally toothed stator 41 and an externally toothed rotor 43. The rotor 43 defines a set of internal splines 45, and in splined engagement therewith is a set of external splines 47, formed at the rearward end of a drive shaft 49. The shaft 49 has a bifurcated forward end permitting driving connection between the shaft 49 and the sleeve 37 by means of a pin 51 passing through a pair of circumferentially-elongated pin openings 53 in the spool 35. Thus, pressurized fluid flowing through the valving in response to the turning of the spool 35 flows to the fluid meter 23 causing orbital and rotational movement of the rotor 43 (metering member) within the stator 41. Such movement of the rotor 43 causes follow-up movement of the sleeve 37 by means of the drive shaft 49 and pin 51, to maintain an appropriate relative displacement between the spool 35 and sleeve 37, for any particular rate of rotation of the steering wheel. A plurality of leaf springs 55, extending through spring openings 57 in the spool 35, urges the sleeve 37 toward the neutral position, relative to the spool 35.

Figure 3:
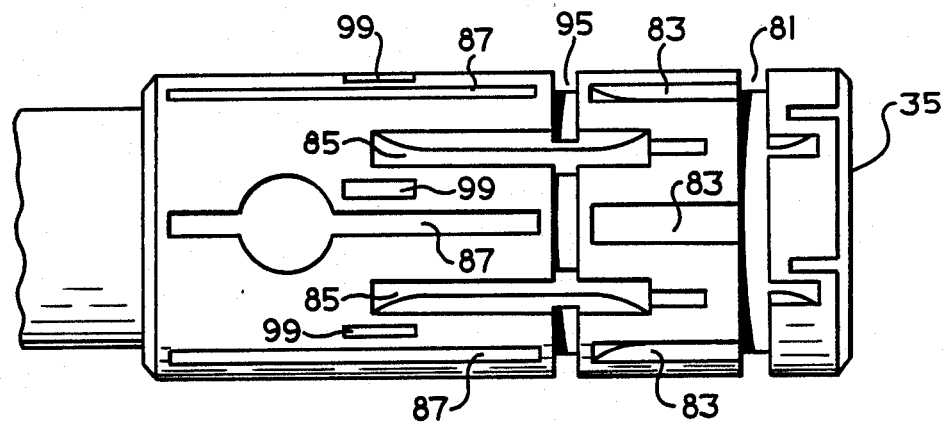
FIG. 3 is an elevation view of the primary valve member utilized in the controller of FIG. 2.
Figure 4:
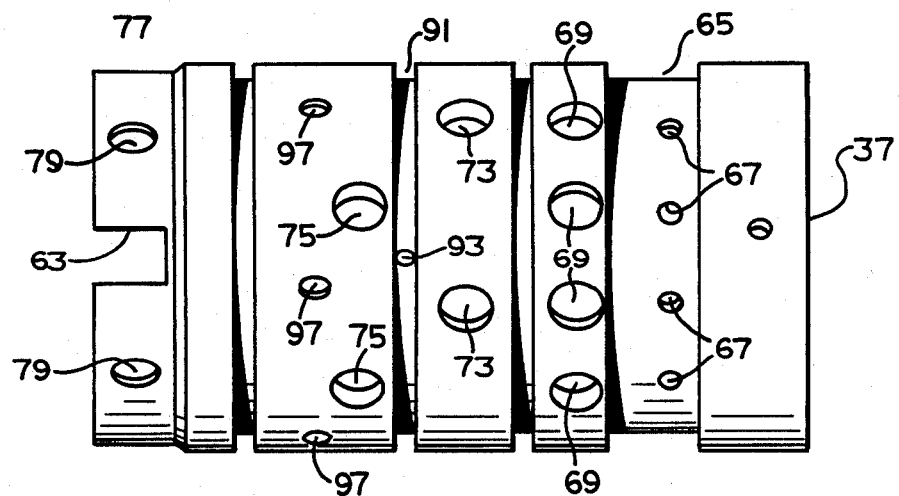
FIG. 4 is an elevation view of the follow-up valve member utilized in the controller of FIG. 2.

Referring now to FIGS. 3 and 4, the spool 35 and sleeve 37 may be seen in greater detail. It should be noted that in FIGS. 3 and 4, the spool 35 and sleeve 37 are shown in their proper relative axial position, i.e., the right end surface of both lie in the same plane. However, the spool 35 and sleeve 37 are not necessarily shown in their proper relative rotational position to define therebetween the neutral condition illustrated schematically in FIG. 1.

Referring now more specifically to FIG. 4, it may be seen that the sleeve 37 defines a pair of diametrically-opposed openings 63 through which the leaf springs 55 extend radially outwardly. The sleeve 37 defines an annular groove 65 disposed axially to be in continuous fluid communication with the annular groove 29g. Disposed in fluid communication with the groove 65 is a plurality of ports 67 which, in the neutral position, have communication therethrough blocked by the outer surface of the spool 35. To the left of the annular groove 65 is a plurality of meter ports 69 which communicate between the valving and the expanding and contracting volume chambers of the fluid meter 23 by means of a plurality of axial bores defined by the housing 19 (not shown in FIG. 2). Disposed to the left of the meter ports in FIG. 4 is a plurality of cylinder ports 73 and a plurality of cylinder ports 75 disposed such that when the ports 73 communicate metered fluid to one end of the cylinder 17, the ports 75 receive return fluid from the opposite end of the cylinder 17. At its left end, the sleeve 37 includes a portion 77 having a slightly reduced diameter, such that an annular passage is defined between the valve bore 33 and the reduced portion 77. The portion 77 defines a plurality of tank openings 79.

Referring now to FIG. 3, the spool 35 defines an annular groove 81, and in communication therewith, a plurality of axial slots 83. When the spool 35 is displaced from the neutral position, relative to the sleeve 37, every other port 67 begins to communicate with the adjacent axial slot 83 to define therebetween a variable orifice, the composite of these individual variable orifices comprising the main flow control orifice of the controller 15. Each of the axial slots 83 also communicates with one of the meter ports 69, and metered fluid returning from the fluid meter 23 flows through alternate ones of the meter ports 69 and enters an adjacent axial slot 85. The axial slots 85 communicate with either the adjacent cylinder ports 73, or the adjacent cylinder ports 75, depending upon the direction of rotation of the steering wheel. In either case, fluid returning from the cylinder 17 through the other of the cylinder ports 73 or 75 then flows through the respective axial slot 87. The left end of each of the axial slots 87 communicates with one of the openings 79, such that this return fluid flows through the annular passage surrounding the portion 77, then through the annular groove 31g to the fluid return port 31, from where it flows back to the system reservoir (see FIG. 1). The above-described flow path is typically referred to as the main fluid path of the controller.

It should be noted that all of the structure described up to this point is well known in connection with controllers of the type sold commercially by the assignee of the present invention. Referring now to FIG. 5, in conjunction with FIGS. 2-4, the problem overcome by the present invention will be described.

When the operator turns the vehicle steering wheel to select a right turn condition, pressurized, metered fluid is communicated through the valve members 35 and 37 as described previously, and flows from the cylinder ports 73 into the annular groove 32g, and from there to the fluid port 32, and then to the right end of the steering cylinder 17. When the piston within the cylinder 17 moves leftward (in FIG. 1) until it engages the cylinder stop (shown schematically in FIG. 1 as the end wall of the cylinder), the sleeve 37 is then recentered, or returned to the neutral position, relative to the spool 35. One result of this "steering against the stops", and then returning to neutral, condition is that the cylinder ports 73 are no longer in open communication with the respective axial slots 85, and the fluid contained between the cylinder ports 73 and the right end or chamber of the cylinder 17 is now trapped therein. This trapped pressurized fluid, which is present in the annular groove 32g, surrounds the sleeve 37 and exerts sufficient hydraulic force on the sleeve 37 (in the region of the ports 73) to clamp the sleeve 37 against the outside surface of the spool 35. When the operator next attempts to rotate the steering wheel, and rotate the spool 35 relative to the sleeve 37, the clamping of the sleeve on the spool will make it necessary for the operator to exert significantly more torque on the steering wheel in order to rotate the spool 35. This condition is typically referred to as "stiction", and is considered a very undesirable condition from the standpoint of the vehicle operator.

When the vehicle operator rotates the steering wheel in the opposite direction to select a left turn condition, pressurized fluid is communicated to the cylinder ports 75, and from there through the annular groove 34g to the port 34, and then to the left end or chamber of the steering cylinder 17. Again, when cylinder travel to the right results in engagement of the piston with the cylinder stops, and the valving returns to the neutral condition, pressurized fluid is trapped, but in this case, it is trapped pressurized fluid in the annular groove 34g (in the region of the cylinder port 75), which exerts a hydraulic force tending to clamp the sleeve to the spool.

Referring now primarily to FIGS. 3-6, the solution to the above-described stiction problem which is provided by the present invention will be described in detail. In the subject embodiment, the sleeve 37 defines an annular balancing groove 91 (FIGS. 4 and 6) disposed on the outer surface of the sleeve, axially between the set of cylinder ports 73 and the set of cylinder ports 75. The sleeve 37 further defines a balancing passage 93 communicating between the groove 91 and the interior of the sleeve 37. As may best be seen in FIG. 6, when the controller has been in a right turn condition, the trapped pressurized fluid in the annular groove 32g is able to leak across the narrow sealing land between the annular groove 32g and the balancing groove 91. Thus, as the valving returns to the neutral position, the trapped pressurized fluid leaking into the balancing groove 91 flows through the balancing passage 93, and then flows into the adjacent axial slot 85. In the subject embodiment, only a single balancing passage 93 is required because all six of the axial slots 85 are interconnected by an annular groove 95 (see FIG. 3). Therefore, the trapped, pressurized fluid is communicated into all six of the axial slots 85, and because the axial slots 85 are axially aligned with the annular groove 32g (see FIG. 6), the pressurized fluid in the axial slots 85 and annular groove 95 is able to counteract the hydraulic pressure of the trapped fluid in the annular groove 32g, substantially preventing clamping of the sleeve on the spool.

In a left turn condition, trapped pressurized fluid which is contained in the annular groove 34g is similarly communicated to the annular balancing groove 91 by leaking across the narrow sealing land between the groove 34g and the groove 91. As explained in connection with a right turn condition, the trapped pressurized fluid in the balancing groove 91 is then communicated through the balancing passage 93 into all of the axial slots 85.

In the course of developing the subject embodiment of the invention it has been found that using the axial slots 85 and annular groove 95 as "pressure balancing areas" is sufficient in the case of a right turn condition (slots 85 axially aligned with the annular groove 32g). Using the axial slots 85 as pressure balancing areas has also been found to be sufficient in the case of a left turn condition up to a pressure such as 2,500 psi. However, with increasing demand for controllers operable in the 3,000 to 3,500 psi range, it has been found that stiction would still occur at such pressures, after the valving would return to the neutral position from a left turn condition.

Figure 7:
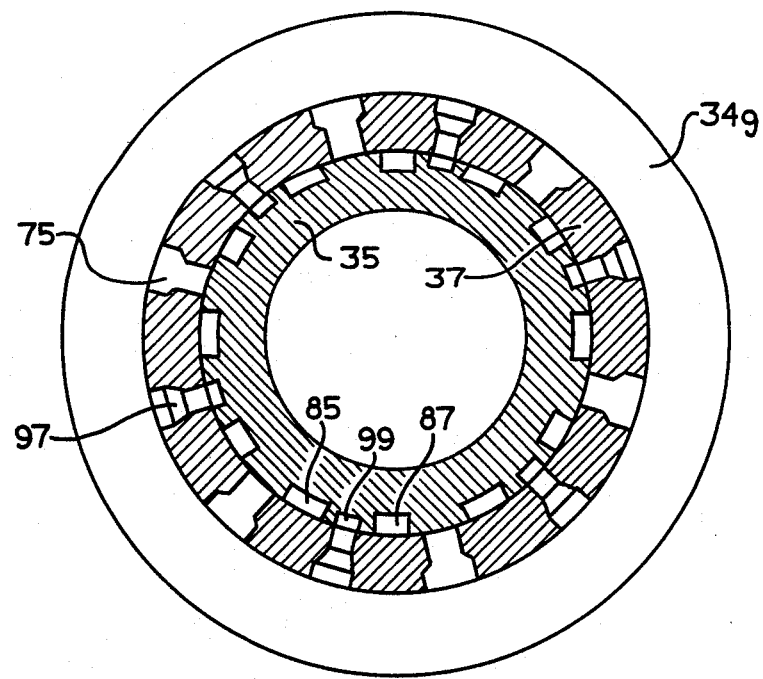
FIG. 7 is a transverse cross-section of the controller shown in FIG. 2, but taken on line 7—7 of FIG. 5, and with the valving shown in the neutral position.

Accordingly, the present invention provides a further pressure balancing arrangement which may best be seen by referring again to FIGS. 3-6, in conjunction with FIG. 7. The sleeve 37 defines a plurality of radial balancing passages 97, disposed just to the left of the cylinder ports 75 in FIGS. 4 and 5. In the subject embodiment, there are six of the passages 97 for reasons which will become apparent subsequently. Referring now primarily to FIGS. 3 and 5, the spool 35 defines a plurality of recessed pressure balancing areas 99. In the subject embodiment, there are six of the areas 99, with one being disposed adjacent each of the axial slots 85. Preferably, each of the areas 99 may be milled into the spool 35, at the same time the other various axial slots are being machined. However, it should be understood that neither the particular configuration of the areas 99 nor the process for producing them form an essential part of the present invention.

Referring now primarily to FIG. 6, each of the balancing passages 97 is positioned axially to be in continuous, open communication with the annular groove 34g. Therefore, as the valving returns to neutral from a left turn condition, trapped pressurized fluid in the groove 34g is communicated through each of the passages 97 into the respective balancing area 99 (see FIGS. 5 and 7). Thus, upon a return to the neutral position from a left turn condition, the trapped pressurized fluid is present in all six of the axial slots 85, and in all six of the pressure balancing areas 99, providing more total area of pressure balance, and also providing pressure balance further to the left axially (in FIGS. 3, 5 and 6).

Figures 8, 9:
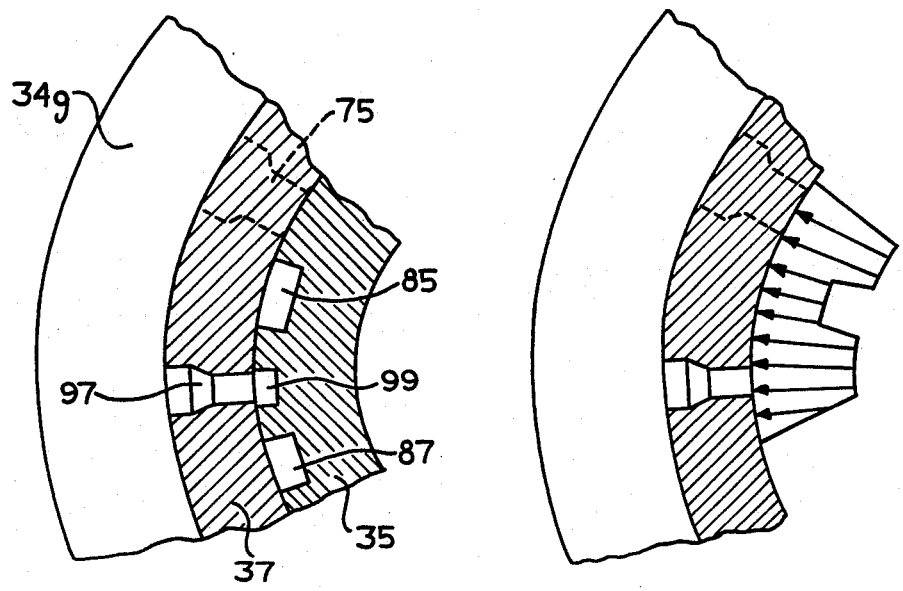
FIG. 8 is a further enlarged, fragmentary view similar to FIG. 7.
FIG. 9 is a somewhat schematic view similar to FIG. 8, but showing only the follow-up valve member (sleeve), and illustrating a profile of the fluid pressures acting on the sleeve.

Referring now to FIGS. 8 and 9, the results of the present invention will be illustrated and described in connection with a pressure profile, showing the hydraulic forces acting on the sleeve 37. FIG. 8 is an enlarged, fragmentary view similar to FIG. 7 showing one each of the cylinder ports 75, axial slots 85 and 87, balancing passages 97 and balancing areas 99. FIGS. 7 and 8 both illustrate the valve means in the neutral position. FIG. 9 is the pressure profile, wherein the arrows pointing radially inwardly against the exterior of the sleeve 37 represent the clamping forces resulting from the trapped pressurized fluid in the annular groove 34g. Counteracting those forces are the balancing forces resulting from the pressurized fluid in the axial slot 85 and the balancing area 99.

The invention has been described in detail sufficient to enable one skilled in the art to make and use the same. Obviously, various alterations and modifications of the invention will occur to others upon a reading and understanding of the specification, and it is intended to include all such alterations and modifications as part of the invention, insofar as they come within the scope of the appended claims.

I claim:

1. A controller operable to control the flow of fluid from a source of pressurized fluid to a fluid pressure operated device; said controller being of the type including housing means defining an inlet port for connection to the source of pressurized fluid, a return port, and first and second control fluid ports for connection to the fluid pressure operated device; valve means disposed in said housing means, and including a primary, rotatable generally cylindrical valve member and a relatively rotatable, generally cylindrical and hollow follow-up valve member surrounding said primary valve member, said valve members defining a neutral position and an operating position; said housing means and said valve means cooperating to define a main fluid path communicating between said inlet port and said first control fluid port when said valve means is in said operating position; fluid actuated means for imparting follow-up movement to said follow-up valve member in response to the flow of fluid through said main fluid path; said housing means and said follow-up valve member being configured such that pressurized fluid contained in said main fluid path when said valve means is in said operating position may become trapped as said valve means returns to said neutral position, said trapped pressurized fluid being disposed about said follow-up valve member, and tending to bias said follow-up valve member into engagement with said primary valve member; characterized by:
 (a) said primary and follow-up valve members cooperating to define, at the interface thereof, a plurality of recessed balancing areas spaced circumferentially about said valve members; and
 (b) said primary and follow-up valve members cooperating to define at least one balancing passage means being operable to communicate said trapped pressurized fluid into said recessed balancing areas when said valve means returns to said neutral position, whereby said trapped pressurized fluid in said recessed balancing areas opposes said trapped pressurized fluid disposed about said follow-up valve member to substantially prevent clamping engagement of said follow-up valve member to said primary valve member.

2. A controller as claimed in claim 1 characterized by said fluid pressure operated device being of the type including a cylinder and a piston, linearly movable within said cylinder, said linear movement of said piston being limited by stop means, whereby pressure actuated movement of said piston into engagement with said stop means results in generation of said trapped pressurized fluid.

3. A controller as claimed in claim 1 characterized by said fluid actuated means comprising a fluid meter including a metering member movable to measure the volume of fluid flowing through said main fluid path, said controller further comprising means coupling said metering member to said follow-up valve member.

4. A controller as claimed in claim 3 characterized by said fluid meter being disposed in series flow relationship in said main fluid path, between said inlet port and said first control fluid port.

5. A controller as claimed in claim 1 characterized by said housing means and said follow-up valve member cooperating to define an annular groove in open fluid communication with each of said first and second control fluid ports, one of said annular grooves containing said trapped pressurized fluid.

6. A controller as claimed in claim 5 characterized by said primary valve member defining a plurality N of axially oriented passages comprising a portion of said main fluid path, said follow-up valve member defining a plurality N of ports, in continuous, open communication with said annular groove, and each of said plurality N of ports being in fluid communication with one of said plurality N of axially oriented passages, when said valve means is in said operating position.

7. A controller as claimed in claim 6 characterized by said follow-up valve member defines said balancing passage means, disposed axially adjacent said plurality N of ports, said plurality N of axially oriented passages comprising said plurality of recessed balancing areas, said balancing passage means being in communication with said plurality N of axially oriented passages when said valve means is in said neutral position.

8. A controller as claimed in claim 5 characterized by said primary valve member defining a plurality N of axially oriented passages comprising a portion of said main fluid path and a plurality M of said recessed balancing areas, separate from said axially oriented passages, and said follow-up valve member defining a plurality M of balancing passages, each of said balancing passages being in continuous, open communication with one of said annular grooves, and being in communication with one of said recessed balancing areas when said valve means is in said neutral position.

9. A controller operable to control the flow of fluid from a source of pressurized fluid to a fluid pressure operated device; said controller being of the type including housing means defining an inlet port for connection to the source of pressurized fluid, a return port, and first and second control fluid ports for connection to the fluid pressure operated device; valve means disposed in said housing means, and including a primary, rotatable generally cylindrical valve member and a relatively rotatable, generally cylindrical and hollow follow-up valve member surrounding said primary valve member, said valve members defining a neutral position and first and second operating positions; said housing means and said valve means cooperating to define a first main fluid path communicating between said inlet port and said first control fluid port when said valve means is in said first operating position, and a second main fluid path communicating between said inlet port and said second control fluid port when said valve means is in said second operating position; fluid actuated means for imparting follow-up movement to said follow-up valve member in response to the flow of fluid through one of said first and second main fluid paths; said housing means and said follow-up valve member being configured such that pressurized fluid contained in one of said first and second main fluid paths may become trapped as said valve means returns to said neutral position from one of said first and second operating positions, respectively, said trapped pressurized fluid being disposed about said follow-up valve member, and tending to bias said follow-up valve member into engagement with said primary valve member; characterized by:

(a) said primary valve member defining a plurality N of axially oriented passages comprising a portion of said first main fluid path, and said follow-up valve member defining a balancing passage means in fluid communication with said first control fluid port when said valve means is in said first operating position, and in communication with said plurality N of axially oriented passages when said valve means is in said neutral position; and (b) said primary valve member defining, at its interface with the follow-up valve member, a plurality M of recessed balancing areas, spaced circumferentially about said primary valve member, said follow-up valve member defining a plurality M of balancing passages, each of said balancing passages being in continuous, open communication with said second control fluid port when said valve means is in said second operating position, and in communication with one of said recessed balancing areas when said valve means is in said neutral position.

* * * * *